United States Patent [19]

Hoshimi et al.

[11] 4,063,137

[45] Dec. 13, 1977

[54] ELECTRIC BRAKING APPARATUS FOR ALTERNATING CURRENT MOTORS

[75] Inventors: Susumu Hoshimi, Yokohama; Toshio Sato, Zama, both of Japan

[73] Assignee: Sony Corporation, Tokyo, Japan

[21] Appl. No.: 662,951

[22] Filed: Mar. 1, 1976

[30] Foreign Application Priority Data

Mar. 5, 1975 Japan .................................. 50-26778

[51] Int. Cl.² ............................................. H02P 3/20
[52] U.S. Cl. ................................................. 318/212
[58] Field of Search ............... 318/212, 211, 209, 210, 318/220 R, 221 R

[56] References Cited

U.S. PATENT DOCUMENTS

| | | | |
|---|---|---|---|
| 3,340,449 | 9/1967 | Elliott | 318/212 |
| 3,408,550 | 10/1968 | Graham | 318/212 |
| 3,475,669 | 10/1969 | Oltendorf | 318/212 |
| 3,798,523 | 3/1974 | Gross | 318/212 |

*Primary Examiner*—Herman J. Hohauser
*Attorney, Agent, or Firm*—Lewis H. Eslinger; Alvin Sinderbrand

[57] ABSTRACT

An electric braking circuit for a.c. motors is disclosed. When the a.c. power is cut off from the motor windings, at the same time a switch is thrown to connect the a.c. source of power to the same windings via a rectifier and a smoothing circuit, to thereby bring the motor to an immediate smooth stop.

3 Claims, 6 Drawing Figures

ELECTRIC BRAKING APPARATUS FOR ALTERNATING CURRENT MOTORS

BACKGROUND OF THE INVENTION

The present invention relates to an electric braking apparatus for alternating current electric motors, and is particularly adapted for braking such electric motors used for record turntables or the like.

Moden turntables for record player are known to have a relatively large mass and as a consequence braking means is necessary to bring the turntable to a quick stop. This is particularly the case for direct drive turntables. In such a turntable, driven by an a.c. electric motor, e.g., a single-phase induction motor, if there were no braking means the turntable might continue to rotate for up to three minutes after the power to the motor is cut off. This defect is particularly annoying when the operator desires to switch speeds, e.g., from 33 rpm to 45 rpm. In such cases a stabilized rotation will not be obtained quickly because of the large mass of the turntable.

Various methods and techniques are known for braking motors of the above mentioned type, and the most convenient are electric methods which do not require additional mechanical devices but do provide for automatic control of the braking process. One known technique is to reverse switch the windings of the a.c. motor thereby changing the phase sequence of the supply voltage to the windings and placing a reverse torque on the rotor. In the latter case braking is controlled by a special speed control relay linked to the motor shaft. Unfortunately, such braking systems are not completely reliable due to the possibility of reverse rotation of the motor if the speed control relay fails.

The best known and most promising method of braking a.c. motors is dynamic braking, which is accomplished by feeding direct current (d.c.), via a suitable circuit, to one or more of the windings of the motor. The dynamic braking method is relatively smooth as compared with the reverse switching method, and has the further advantage that it eliminates the possibility of reverse rotation of the motor and provides for a braking moment practically during the whole process of braking. However, inasmuch as the d.c. current is produced by a half-wave rectifier, the current flowing through the windings will include a direct current component and an alternating-current component, thereby limiting the smoothness of the braking operation. Also, since such techniques often include the use of a mechanical relay circuit, switching noise or undesirable vibrations (e.g., mechanical chattering) may result.

SUMMARY OF THE INVENTION

It is therefore an object of the present invention to provide a braking system which eliminates the aforementioned disadvantages.

Another object of the present invention is to provide a simple and effective apparatus for accomplishing the braking of an a.c. motor.

Another object of the present invention is to provide an electric braking apparatus for a.c. motors having first and second windings to which a direct current is fed during a braking interval so as to provide effective braking.

Yet another object of the present invention is to provide an electric braking apparatus for a.c. motors having electrical switching circuits to be operated during the braking interval, whereby switching noise, such as is caused by a mechanical relay, is eliminated.

These and other objects of the present invention are carried out by providing an electric braking apparatus for a.c. motors having first and second windings, wherein, during the braking interval, alternating current is inhibited from flowing through the windings and direct current is applied to flow through the windings, whereby effective braking is obtained. A control circuit controls a variable impedance circuit so as to inhibit alternating current from flowing through the winding during the braking interval, and a direct current producing circuit provides a direct current which is applied to the windings during the braking interval.

DETAILED DESCRIPTION OF THE INVENTION

Figure 1:
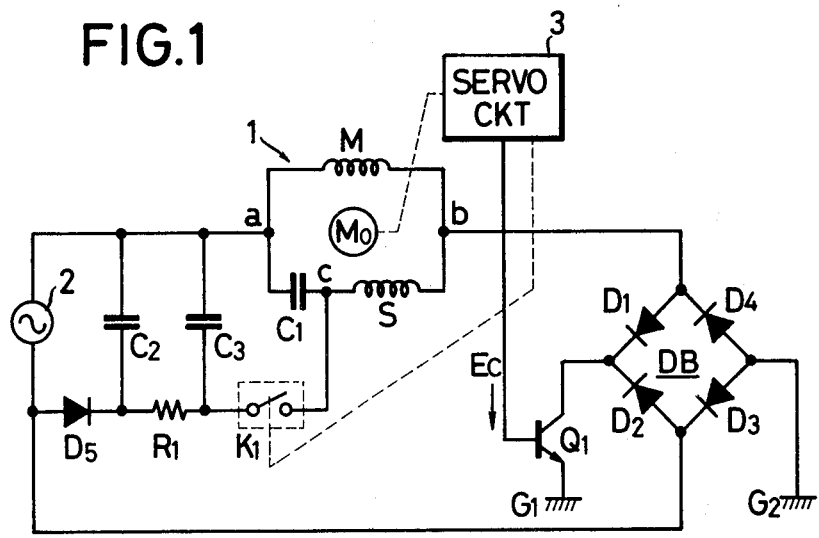
FIG. 1 is a circuit diagram of an electric braking apparatus for an alternating current electric motor in accordance with the present invention.

Referring to FIG. 1, there is shown a conventional a.c. motor 1 consisting of a main winding M, auxiliary winding S, phase-lead capacitor $C_1$ and a rotor Mo. The auxiliary winding S is connected in series with the capacitor $C_1$, and the main winding M is connected in parallel with the series circuit of the auxiliary winding S and the capacitor $C_1$. An a.c. power source 2 has one terminal connected to terminal (a) of motor 1 and the other terminal connected to a diode bridge, DB, consisting of four diodes $D_1$, $D_2$, $D_3$ and $D_4$. The diode bridge is also connected to terminal (b) of motor 1. A servo circuit 3, which may be any one of several well known types for detecting the rotational speed of the rotor Mo, provides a control signal output, Ec, in response to the rotational speed, to the base of a variable impedance means, shown as a transistor $Q_1$. The collector electrode of $Q_1$ is connected to the cathodes of diodes $D_1$ and $D_2$, and the emitter electrode of $Q_1$ is connected to a ground point $G_1$. During normal operation of the motor the current path of the a.c. current is as follows: During the positive half cycle; source 2, terminal (a), motor windings, terminal (b), diode $D_1$, transistor $Q_1$, ground point $G_1$, ground point $G_2$, diode $D_3$, source 2. During the negative half cycle; source 2, diode $D_2$, transistor $Q_1$, ground point $G_1$, ground point $G_2$, diode $D_4$, terminal (b), motor windings, terminal (a), source 2. Of course, the current flowing through the series circuit of auxiliary winding S and capacitor $C_1$ leads by 90° the current flowing through the main winding M, as is well known. Thus, the rotor Mo is rotated by a magnetic field produced by the current flowing through windings M and S. Further, during the time that rotor Mo is rotated at the predetermined rotational speed, the servo circuit 3 produces a constant control signal $Ec$, so that the impedance between the collector and emitter of the transistor $Q_1$ is kept at a predetermined value. Thus, the rotation of the rotor $Mo$ is controlled at the desired constant speed.

In accordance with the present invention there is provided a direct current circuit comprising a rectifier, such as diode $D_5$, a smoothing circuit, consisting of resistor $R_1$ and capacitors $C_2$, $C_3$, and a switching circuit $K_1$. The anode of diode $D_5$ is connected to one terminal of the power source 2, the cathode of diode $D_5$ is connected to one terminal of the switching circuit $K_1$ through resistor $R_1$, the other terminal of the switching circuit $K_1$ is connected to a point C provided between capacitor $C_1$ and auxiliary winding S, the capacitor $C_2$ is connected between the cathode of diode $D_5$ and the other terminal of power source 2, and the capacitor $C_3$ is connected between a connection point of resistor $R_1$ with switching circuit $K_1$ and the other terminal of power source 2.

In the conventional operation of a turntable system, when the controls are changed from 45 rpm to 33 rpm by a switching means (not shown), or when a pick up arm is removed from a disk record, the servo circuit 3 will be cut off because an operative voltage will no longer be supplied thereto in response to a function of the switching means. As a result the control signal $Ec$ will no longer be supplied to the base of transistor $Q_1$, and, thus, the impedance between the collector and emitter of transistor $Q_1$ will increase sufficiently to completely turn off the transistor and block a.c. current from flowing through the main and auxiliary windings, M and S. At that time, the switching circuit $K_1$, shown in FIG. 1 as being mechanically linked with the cut off mechanism of the servo circuit, is closed, and a current, which is rectified by the diode $D_5$ and smoothed by capacitors $C_2$ and $C_3$ and resistor $R_1$, will flow through switching circuit $K_1$, point $c$, auxiliary winding S, point $b$, main winding M and point $a$ as a smoothed d.c. current. The latter direct current produces a torque which is opposed to the rotating direction of the rotor $Mo$. Thus, the rotation of rotor $Mo$ is reduced quickly. It should be noted that the braking circuit need not supply the d.c. braking current to the entire windings of the motor. For example, the switch $K_1$ could be connected to point $b$ instead of to point $c$.

Figure 2:
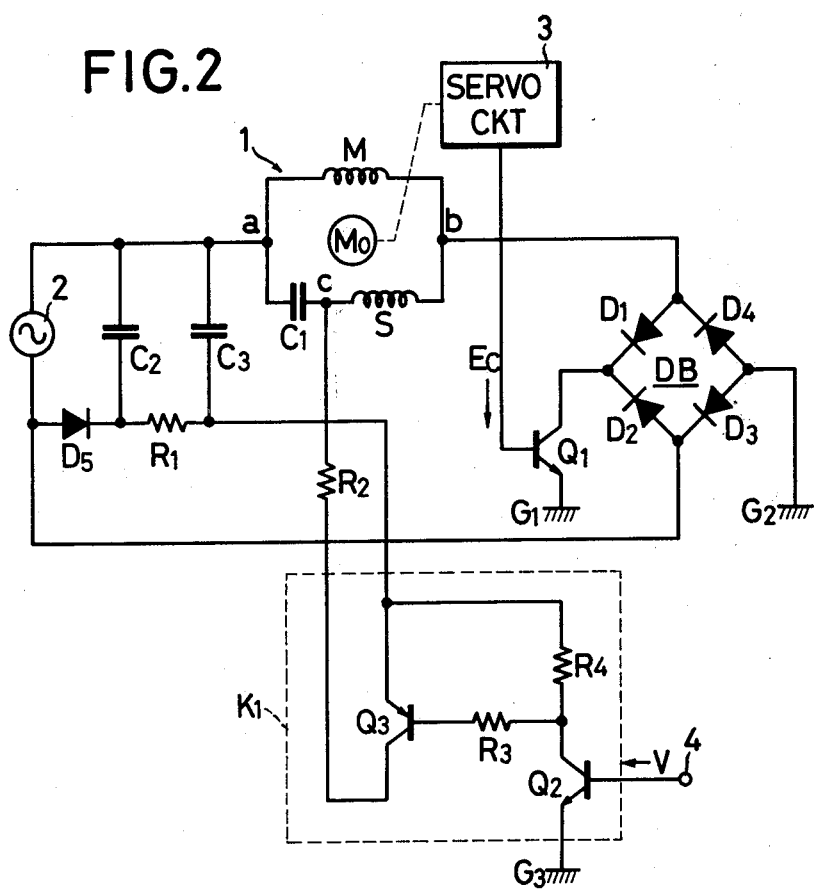
FIG. 2 is a circuit diagram of an electric braking apparatus similar to that shown in FIG. 1, but including an electronic switching mechanism.

The same circuit shown in FIG. 1 is shown again in FIG. 2 except that an electronic switching circuit $K_1$ has been susbtituted for the mechanical switch illustrated generally in FIG. 1. A switching circuit in this embodiment, comprises primarily an NPN transistor $Q_2$ and a PNP transistor $Q_3$. The collector electrode of $Q_3$ is connected to point $c$ of the motor winding circuit through a resistor $R_2$, the emitter electrode is connected to the resistor $R_1$ so as to be supplied with direct-current voltage, and the base electrode is connected to the collector electrode of transistor $Q_2$ through a resistor $R_3$. The collector electrode of transistor $Q_2$ is connected to the resistor $R_1$ through a resistor $R_4$ so as to be supplied with direct-current voltage, the emitter electrode of $Q_2$ is connected to ground point $G_3$, and the base electrode of $Q_2$ is connected to an input terminal 4 to which a switching signal V is applied during the braking process, as will be described further in connection with FIG. 6. In this embodiment, when no switching signal V is applied to the input terminal 4 (i.e., $V = 0$ volts) transistors $Q_2$ and $Q_3$ are cut off and motor 1 is driven under the normal condition. However when the motor 1 is changed over from 45 rpm to 33 rpm, the current flow through the windings M and S is inhibited because the control signal $Ec$ is removed from the transistor $Q_1$. At the same time, the switching signal V is applied to the base of transistor $Q_2$, thereby turning on transistors $Q_2$ and $Q_3$. Thus, the switching circuit $K_1$ is closed and the braking process is performed.

Figure 3:
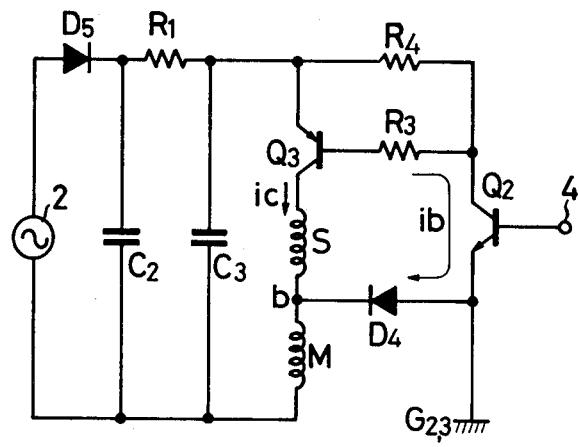
FIG. 3 is an equivalent circuit diagram of the circuit of FIG. 2 during the braking process.

FIG. 3 illustrates the equivalent of the circuit of FIG. 2, during the braking interval. When the transistors $Q_2$ and $Q_3$ are in the ON state, the emitter electrode of transistor $Q_2$ is connected to the point $b$ through the ground points $G_3$ and $G_2$ and diode $D_4$. Therefore, direct current $i_b$ flows through resistor $R_3$, transistor $Q_2$, diode $D_4$ and main winding M. Also, direct current $i_c$ flows through transistor $Q_3$ and auxiliary winding S. The action of the direct current through the windings causes braking. Further, in FIG. 2, it is possible to obtain a braking effect if direct current flows only through the main winding. In that case, the collector electrode of transistor $Q_3$ would be connected to point $b$.

Figure 4:
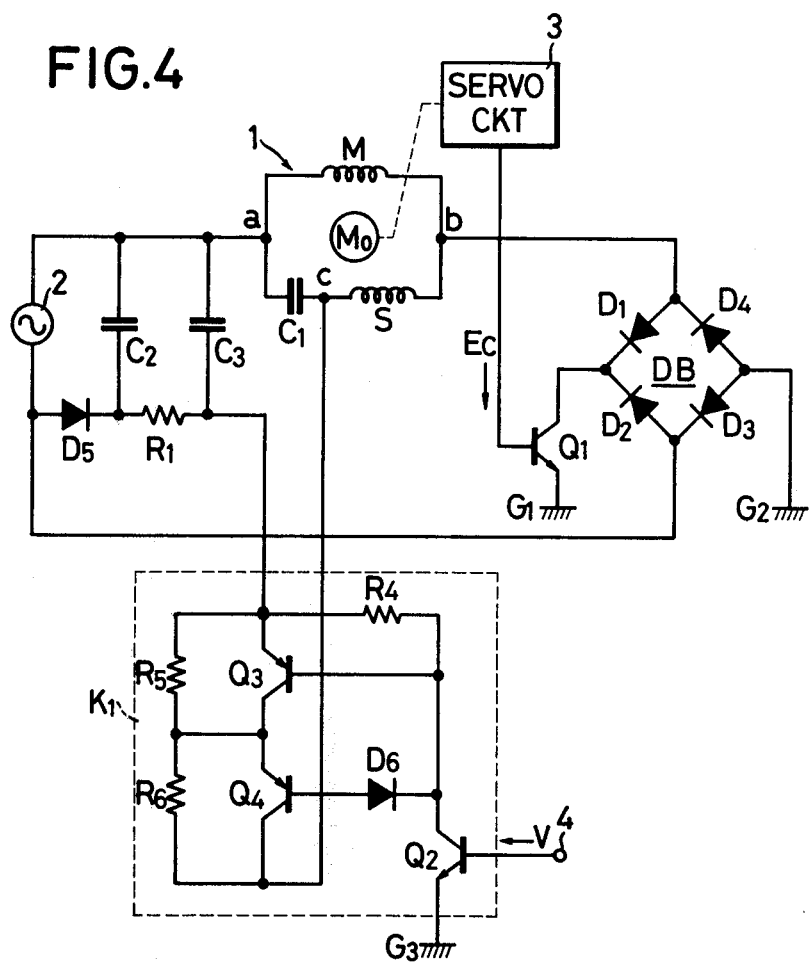
FIG. 4 is a circuit diagram of a second embodiment of an electric braking apparatus in accordance with the present invention.

When the transistors $Q_2$ and $Q_3$ are in the OFF state, a high d.c. voltage is supplied between the emitter and collector electrodes of transistor $Q_3$, e.g., 114V if power source 2 provides 100V a.c. Such a large d.c. voltage presents a danger of destruction of the PNP transistor. That possibility can be avoided by the variation shown in FIG. 4, wherein an additional PNP transistor $Q_4$ is connected in series with the transistor $Q_3$ in order to divide the d.c. voltage between the two series transistors. Resistors $R_5$ and $R_6$ are voltage dividing resistors, and diode $D_6$ serves as a protective device.

Figure 5:
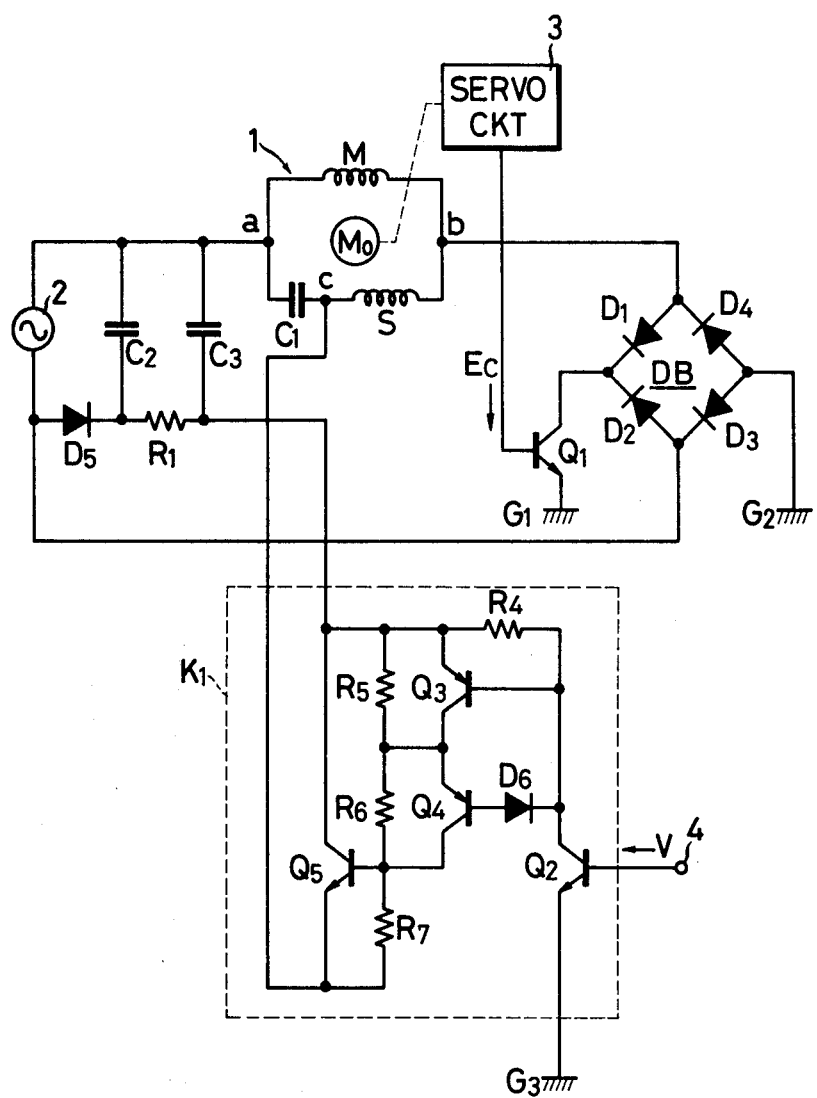
FIG. 5 is a circuit diagram of a third embodiment of an electric braking apparatus in accordance with the present invention.

A still further alternative of the switching circuit is shown in FIG. 5, wherein an NPN transistor $Q_5$ is connected between resistor $R_1$ and the point $c$. When the transistors $Q_2$ through $Q_5$ are placed in the ON state by the braking signal, a direct current flows through windings M and S to perform the braking process. The transistors $Q_2$ through $Q_4$ amplify the braking signal V. The breakdown voltage of the NPN transistor $Q_5$ is higher than that of PNP transistors so that only a single transistor is necessary in the series circuit.

Figure 6:
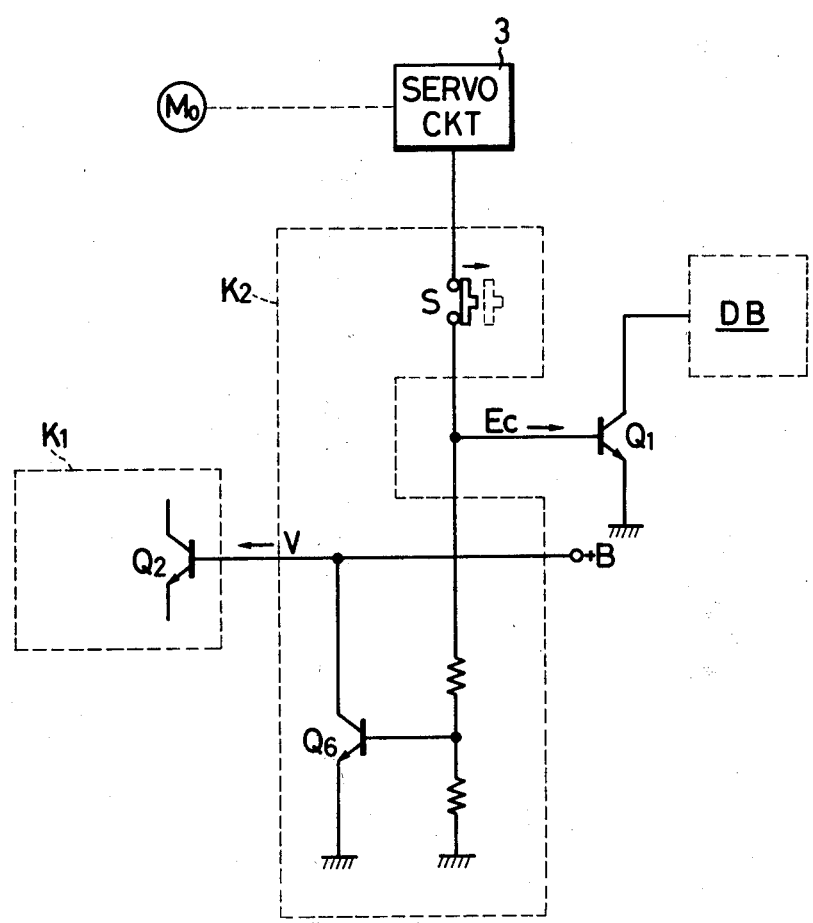
FIG. 6 shows an electric circuit diagram of a braking signal producing circuit.

FIG. 6 shows a circuit $K_2$ for producing a braking signal V. The circuit $K_2$ comprises a switching means S, which is opened during the braking process, a voltage source $+B$, and an NPN transistor $Q_6$, whose base electrode is connected to the servo circuit 3 through the switch S and whose collector-emitter path is connected across the voltage source $+B$. Additionally, the voltage source $+B$ is connected to the transistor $Q_2$ of the switch circuit $K_1$. In the normal condition, the switching means S is closed, so that the control signal $Ec$ is applied to the base of transistor $Q_1$ and the base of transistor $Q_6$ is held positive. Transistor $Q_6$ will be in the ON state thereby placing the voltage at the base of $Q_1$ substantially at ground. Under this condition it is considered that no braking signal is supplied to $Q_2$. However, when the switching means S is opened, thereby initiating the braking process, the control signal $Ec$ no longer appears at the the base of transistor $Q_1$, thereby cutting off $Q_1$ and cutting off the supply of a.c. power to the windings. At the same time, the base of $Q_6$ is grounded, thereby cutting off $Q_6$ and causing the voltage $V = +B$ (the braking signal) to be applied to the base of $Q_2$ of switching circuit $K_1$.

What is claimed is:

1. An electric braking apparatus for alternating current electric motors comprising:

a. a motor circuit having, a first winding and a series circuit consisting of a second winding and a capacitor, the series circuit being connected in parallel to said first winding;
b. an a.c. power source for applying a.c. to said motor circuit;
c. a diode bridge circuit connected between said motor circuit and said a.c. power source;
d. a variable impedance means connected to said diode bridge circuit so as to be in the path of the full cycle of the current applied to said motor circuit;
e. a servo circuit for detecting the rotation of said motor to produce a control signal in response to said rotation, said control signal being supplied to said variable impedance means so as to control the impedance value thereof;
f. a rectifier circuit connected to said a.c. power source for producing a d.c. voltage;
g. a smoothing circuit connected to said rectifier circuit for smoothing an output of said rectifier circuit; and
h. a switching circuit connected to said smoothing circuit for selectively applying the rectified smoothed output voltage therefrom to at least one of said windings to brake said motor, said switching circuit including at least a semiconductive device having first, second and third electrodes, said first and second electrodes being connected in series with said smoothing circuit and said at least one winding, and said third electrode being supplied with a braking signal to place said semiconductive device in the ON state.

2. An electric braking apparatus for alternating current electric motors comprising:
a. a motor circuit having, a first winding and a series circuit consisting of a second winding and a capacitor, the series circuit being connected in parallel to said first winding;
b. an a.c. power source for applying a.c. to said motor circuit;
c. a diode bridge circuit connected between said motor circuit and said a.c. power source;
d. a variable impedance means connected to said diode bridge circuit so as to be in the path of the full cycle of the current applied to said motor circuit;
e. a servo circuit for detecting the rotation of said motor to produce a control signal in response to said rotation, said control signal being supplied to said variable impedance means so as to control the impedance value thereof;
f. a rectifier circuit connected to said a.c. power source for producing a d.c. voltage;
g. a smoothing circuit connected to said rectifier circuit for smoothing an output of said rectifier circuit; and
h. a switching circuit connected to said smoothing circuit for selectively applying the rectified smoothed output voltage therefrom to at least one of said windings to brake said motor, said switching circuit including at least two transistors, one of said transistors being connected in series with said smoothing circuit and at least one of said windings, the other transistor being supplied with a braking signal so as to be in a conducting state, said other transistor being connected to the other winding through a diode of said diode bridge circuit, whereby a first direct current flows through said one transistor and one winding, and a second direct current flows through said other transistor and the other winding.

3. An electric braking circuit for alternating current electric motors comprising:
a motor circuit having, a first winding and a series circuit consisting of a second winding and a capacitor, the series circuit being connected in parallel to said first winding;
an a.c. power source for applying a.c. to said motor circuit;
a diode bridge circuit connected between said motor circuit and said a.c. power source;
a variable impedance means connected to said diode bridge circuit so as to be in the path of the full cycle of the current applied to said motor circuit;
a servo circuit for detecting the rotation of said motor to produce a control signal in response to said rotation, said control signal being supplied to said variable impedance means so as to control the impedance value thereof;
a rectifier circuit connected to said a.c. power source for producing a d.c. voltage;
a smoothing circuit connected to said rectifier circuit for smoothing an output of said rectifier circuit;
a switching circuit connected to said smoothing circuit for selectively applying the rectified smoothed output voltage therefrom to at least one of said windings to brake said motor; and
circuit means for producing a braking signal to be applied to said switching circuit to cause said switching circuit to connect said rectified smoothed d.c. voltage to said windings, said braking signal-producing circuit means including,
a. first voltage supply means for applying a braking signal voltage to said switching circuit,
b. first control means responsive to a control signal applied thereto for removing said braking signal voltage from said switching circuit, and
c. a second control means connected between the control signal output of said servo and said first control means, said second control means having first and second states, respectively, connecting and disconnecting said control signal to said first control means, whereby said second control means is placed in the first state to insure normal motor operation and in the second state to cause occurrence of the braking operation.

* * * * *